United States Patent
Lin et al.

(10) Patent No.: US 9,603,133 B2
(45) Date of Patent: Mar. 21, 2017

(54) METHOD AND DEVICE FOR CONFIGURING UPLINK CONTROL CHANNEL RESOURCES IN MULTI-ANTENNA SCENE

(71) Applicant: CHINA ACADEMY OF TELECOMMUNICATIONS TECHNOLOGY, Beijing (CN)

(72) Inventors: Yanan Lin, Beijing (CN); Zukang Shen, Beijing (CN); Xuejuan Gao, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 80 days.

(21) Appl. No.: 13/691,740

(22) Filed: Dec. 1, 2012

(65) Prior Publication Data

US 2013/0170447 A1    Jul. 4, 2013

Related U.S. Application Data

(63) Continuation of application No. PCT/CN2011/079437, filed on Sep. 7, 2011.

(30) Foreign Application Priority Data

Sep. 17, 2010   (CN) .......................... 2010 1 0285802

(51) Int. Cl.
*H04W 72/04* (2009.01)
*H04L 5/00* (2006.01)
(Continued)

(52) U.S. Cl.
CPC ........... *H04W 72/042* (2013.01); *H04L 5/001* (2013.01); *H04L 5/0053* (2013.01);
(Continued)

(58) Field of Classification Search
CPC ..... H04L 5/001; H04L 5/0023; H04L 5/0053; H04L 5/0055; H04L 5/0094; H04L 5/0082; H04W 72/042; H04W 72/02
(Continued)

(56) References Cited

U.S. PATENT DOCUMENTS

2008/0273513 A1    11/2008  Montojo et al.
2009/0232065 A1*    9/2009  Zhang et al. .................. 370/329
(Continued)

FOREIGN PATENT DOCUMENTS

CN          101801097           8/2010
CN          101801097  A  *     8/2010
(Continued)

OTHER PUBLICATIONS

Machine Translation of CN 101801097 A.*
(Continued)

*Primary Examiner* — Paul H Masur
(74) *Attorney, Agent, or Firm* — Ladas & Parry, LLP

(57) ABSTRACT

The technical solutions according to the present disclosure perform configuring the uplink control channel resources for a terminal equipment, by means of a semi-statically configured initial resource and a dynamically configured ACK/NACK Resource Indication (ARI) information which indicates a selection result or offset information. Thereby an uplink control channel resource configuration solution is realized by combining dynamic indication with semi-static indication. The method according to the present disclosure can be achieved in a simple and easy manner, and simultaneously can be used in a Frequency Division Duplexing (FDD) system and a Time Division Duplexing (TDD) system.

13 Claims, 7 Drawing Sheets

(51) Int. Cl.
*H04W 72/02* (2009.01)
*H04B 7/06* (2006.01)

(52) U.S. Cl.
CPC .......... *H04L 5/0082* (2013.01); *H04L 5/0094* (2013.01); *H04W 72/02* (2013.01); *H04B 7/0678* (2013.01); *H04L 5/0023* (2013.01); *H04L 5/0055* (2013.01)

(58) Field of Classification Search
USPC .................................. 370/329; 455/450–454
See application file for complete search history.

(56) References Cited

U.S. PATENT DOCUMENTS

| | | | |
|---|---|---|---|
| 2011/0081932 A1* | 4/2011 | Astely et al. | 455/509 |
| 2011/0243066 A1* | 10/2011 | Nayeb Nazar et al. | 370/328 |
| 2012/0113909 A1* | 5/2012 | Jen | 370/329 |

FOREIGN PATENT DOCUMENTS

| | | |
|---|---|---|
| CN | 102104962 | 6/2011 |
| EP | 2341634 | 7/2011 |
| WO | 2010/050153 | 5/2010 |
| WO | WO 2013170447 | 11/2013 |

OTHER PUBLICATIONS

Huawei, "UL ACK/NACK feedback related DCI design for carrier aggregation", Apr. 12, 2010, 3GPP TSG RAN WG1 Meeting #60bis, pp. 1-4, R1-101943.*
Pantech, "On the cross-carrier CFI signaling by PDCCH", May 10, 2010, 3GPP TSG-RAN WG1 #61, pp. 1-3, R1-102834.*
Huawei, "Overview of UL ACKNACK feedback design issues for carrier aggregation", 3GPP TSG RAN WG1 Meeting #61, pp. 1-5, R1-103087.*
Office Action for related CN Appln No. 201010285802.3 dated Jan. 21, 2013 and its English translation.
Office Action for related JP Appln No. 2013-519951 dated Jan. 22, 2013 and its English translation.
Office Action for related KR Appln No. 10-2012-7031276 dated Nov. 26, 2014 and its English translation.
Final Rejection for related KR Appln No. 10-2012-7031276 dated Sep. 9, 2015 and its English translation.
ISR/WO for related PCT/CN2011/079437 dated Dec. 15, 2011 and its English translation.
CATT, PUCCH Format 1/1a/1b Resource Allocation with Transmit Diversity, 3GPP TSG RAN WG1 Meeting #59 R1-0945 58, Nov. 13, 2009.
3GPP TSG RAN WG1 Meeting #61, R1-103087, Overview of UL ACKNACK feedback design issues for carrier aggregation, Huawei, May 10-14, 2010.
3GPP TSG RAN WG1 Meeting #48bis, R1-071565, LTE uplink ACK channel for downlink MCW MIMO support, Samsung, Mar. 26-30, 2007.
Office action from Korean Patent Application No. 10-2016-7012587 dated Sep. 9, 2016, and its English translation.
Supplementary European Search Report dated Jan. 2, 2017 for European Patent Application No. 11824565.3.
Samsung et al: "Way forward on PUCCH Resource Allocation", 3GPP Draft; R1-105040 WF on PUCCH RA, 3$^{rd}$ Generation Partnership Project (3GPP), Mobile Competence Centre; 650, Route Des Lucioles; F-06921 Sophia-Antipolis Cedex ; France, vol. RAN WG1, no. Madrid, Spain; Aug. 23, 2010-Aug. 27, 2010, Aug. 27, 2010 (Aug. 27, 2010), XP050598677, whole document.
Huawei: "Description of Modified SORTD", 3GPP Draft; R1-105087 Description of Modified SORTD, 3$^{rd}$ Generation Partnership Project (3GPP), Mobile Competence Centre; 650, Route Des Lucioles; F-06921 Sophia-Antipolis Cedex; France, vol. RAN WG1, no. Madrid, Spain; Aug. 23, 2010, Aug. 27, 2010 (Aug. 27, 2010), XP050450302, whole document.

* cited by examiner

METHOD AND DEVICE FOR CONFIGURING UPLINK CONTROL CHANNEL RESOURCES IN MULTI-ANTENNA SCENE

CROSS REFERENCE TO RELATED APPLICATIONS

This application is a continuation of PCT/CN20111079437 filed on Sep. 7, 2011, which claims priority to Chinese Patent Application No. 201010285802.3 entitled "method and device for configuring uplink control channel resources in multi-antenna scene" filed in the Patent Office of the People's Republic of China on Sep. 17, 2010, the disclosures of which are hereby incorporated by reference in their entireties.

FIELD OF THE PRESENT DISCLOSURE

The present disclosure relates to the field of communication technology, in particular to a method and a device for configuring uplink control channel resources in a multi-antenna scene.

Background of the Present disclosure LTE (Long Term Evolution) system adopts HARQ (Hybrid Automatic Repeat Request) to improve the reliability of data transmission. When the downlink HARQ function is enabled, UE (User Equipment) decodes the received downlink data package, then feeds back ACK (ACKnowledgement) if decoding succeeds, otherwise feeds back NACK (Negative ACKnowledgement) and requires the base station to re-transmit the data package if decoding fails. When downlink persistent scheduling service completes, the base station will send SPS (Semi-Persistent Scheduling) resource release indication to UE for informing it of releasing all resources allocated to the service, and UE will feed back ACK to the base station after correctly receiving the indication. UE needs to send such ACK/NACK feedback information to a base station on uplink control channels using uplink control channel resources, for accomplishing the HARQ process.

Regarding current research on uplink control channels of LTE advanced system, it is proposed that the UE with multiple transmitting antennae can use the transmit diversity scheme of SORTD (Spatial Orthogonal Resource Transmit Diversity) to transmit uplink control channels, in order to enhance the reliability or capacity of uplink control signaling transmission. SORTD means each antenna port corresponds to one uplink control channel resource, and the same information is spreaded with the orthogonal sequences selected from resource indices of different antenna ports respectively, then simultaneously transmitted through corresponding antenna ports. A receiving end separates the signal from various antenna ports and performs a combined detection, thus obtaining diversity gain. FIG. 1 refers to a schematic diagram of transmit diversity by SORTD when two antenna ports exist in the related art, in which s is the fed back ACK/NACK information, while $n_1^{PUCCH}$ and $n_2^{PUCCH}$ represent the two different uplink control channel resource indices of the two antenna ports respectively. UE will feed back ACK/NACK information on these two feedback channels, to realize the transmit diversity of PUCCH (Physical Uplink Control Channel).

In Rel-8 LTE system, for the dynamic scheduling ACK/NACK transmitted by PUCCH format 1/1a/1b, the UE will calculate the resource (i.e. channel) index ($n_{AN}$) used for ACK/NACK feedback by CCE (Control Channel Element) index ($n_{CCE}$) occupied by downlink control signaling received on PDCCH (Physical Downlink Control Channel), i.e. each PDCCH corresponds to one available PUCCH format 1/1a/1b uplink control channel resource, which is referred to as "implicit resource" below for short.

During implementation of embodiments of the present disclosure, Inventors found out that the following problems at least exist in the related art:

In the LTE advanced system, a UE provided with multiple transmitting antennae can realize transmit diversity for PUCCH by using SORTD, thereby improving reliability or capacity of uplink control signaling transmission. In case of supporting transmit diversity, each antenna port is to be allocated with one uplink control channel resource. However in the related art, no technical solution can realize the aforementioned configuration and solve the problem.

SUMMARY OF THE INVENTION

The embodiments of the present disclosure provide a method and a device for configuring uplink control channel resources in a multi-antenna scene to achieve the purpose of resource configuration for uplink control channel by combining dynamic indication and semi-static indication.

To achieve the aforementioned purpose, an aspect of the embodiments of the present disclosure provides a method for configuring uplink control channel resources under a multi-antenna scene, which includes: receiving, by a terminal equipment provided with multiple antennae, downlink control information carrying acknowledgement resource indicator (ARI) information, wherein the downlink control information is sent by a network side equipment; selecting, by the terminal equipment, one or more channel resource groups or one or more channel resources corresponding to the ARI information out of an initial channel resource set configured by the network side equipment, wherein the initial channel resource set includes multiple channel resource groups or multiple channel resources; and determining, by the terminal equipment, the channel resources in the selected channel resource group(s) as uplink control channel resources for multi-antenna transmission, or determining the selected channel resource(s) and other channel resource(s) determined by the selected channel resource(s) and one or more offset values as uplink control channel resources for multi-antenna transmission.

In another aspect, the embodiments of the present disclosure also provide a terminal equipment provided with multiple antennae, which includes: a receiving module configured for receiving downlink control information carrying acknowledgement resource indicator (ARI) information, wherein the downlink control information is sent by a network side equipment; a selection module configured for selecting one or more channel resource groups or one or more channel resources corresponding to the ARI information received by the receiving module out of an initial channel resource set configured by the network side equipment, wherein the initial channel resource set includes multiple channel resource groups or multiple channel resources; an offsetting module configured for obtaining, when one or more channel resources are selected by the selection module, other channel resources through the selected channel resources and one or more offset values; and a determination module configured for determining the channel resources in the channel resource group(s) selected by the selection module as uplink control channel resources for multi-antenna transmission, or determining the channel resource(s) selected by the selection module and other channel resource(s) obtained by the offsetting module as uplink control channel resources for multi-antenna transmission.

In another aspect, the embodiments of the present disclosure also provide a method for configuring uplink control channel resources under a multi-antenna scene, which includes: selecting, by a network side equipment, one or more channel resource groups or one or more channel resources configured for a terminal equipment provided with multiple antennae out of an initial channel resource set configured for the terminal equipment, wherein the initial channel resource set includes multiple channel resource groups or multiple channel resources; determining, by the network side equipment, the channel resources in the selected channel resource group(s) as uplink control channel resources for multi-antenna transmission of the terminal equipment, or determining the selected channel resource(s) and other channel resource(s) determined by the selected channel resource(s) and one or more offset values as uplink control channel resources for multi-antenna transmission of the terminal equipment; and sending, by the network side equipment, downlink control information carrying acknowledgement resource indicator (ARI) information to the terminal equipment, in order to configure the uplink control channel resources for the terminal equipment, wherein the ARI information corresponds to one or more channel resource groups or one or more channel resources.

In another aspect, the embodiments of the present disclosure also provide a network side equipment, which includes: a selection module configured for selecting one or more channel resource groups or one or more channel resources configured for a terminal equipment provided with multiple antennae out of an initial channel resource set configured for the terminal equipment, wherein the initial channel resource set includes multiple channel resource groups or multiple channel resources; an offsetting module configured for obtaining, when one or more channel resources are selected by the selection module, the offset channel resources through the selected channel resources and one or more offset values; a determination module configured for determining the channel resources in the channel resource group(s) selected by the selection module as uplink control channel resources for multi-antenna transmission of the terminal equipment, or determining other channel resources according to the channel resource selected by the selection module and one or more offset values obtained by offset module as uplink control channel resources for multi-antenna transmission of the terminal equipment; and a sending module configured for sending downlink control information carrying acknowledgement resource indicator (ARI) information to the terminal equipment, in order to configure the uplink control channel resources for terminal equipment, wherein the ARI information corresponds to one or more channel resource groups or one or more channel resources selected by the selection module.

In another aspect, the embodiments of the present disclosure also provide a method for configuring uplink control channel resources under a multi-antenna scene, which includes: receiving, by a terminal equipment provided with multiple antennae, downlink control information carrying acknowledgement resource indicator (ARI) information, wherein the downlink control information is sent by a network side equipment; and determining, by the terminal equipment, uplink control channel resources corresponding to its own multiple antennae according to an initial channel resource group or an initial channel resource configured by the network side equipment and one or more offset values corresponding to the ARI information.

In another aspect, the embodiments of the present disclosure also provide a terminal equipment provided with multiple antennae, which includes: a receiving module configured for receiving downlink control information carrying acknowledgement resource indicator (ARI) information, wherein the downlink control information is sent by the network side equipment; and a determination module configured for determining uplink control channel resources for multi-antenna transmission according to an initial channel resource group or an initial channel resource configured by the network side equipment and one or more offset values corresponding to the ARI information.

In another aspect, the embodiments of the present disclosure also provide a method for configuring uplink control channel resources under a multi-antenna scene, which includes: determining, by a network side equipment, uplink control channel resources for multi-antenna transmission according to an initial channel resource group or an initial channel resource configured for a terminal equipment provided with multiple antennae and one or more offset values; and sending, by the network side equipment, downlink control information carrying acknowledgement resource indicator (ARI) information to configure the uplink control channel resources for the terminal equipment, to the terminal equipment, wherein the ARI information corresponds to the offset values.

In another aspect, the embodiments of the present disclosure also provide a network side equipment, which includes: a determination module configured for determining uplink control channel resources for multi-antenna transmission according to an initial channel resource group or an initial channel resource configured for a terminal equipment provided with multiple antennae and one or more offset values; and a sending module configured for sending downlink control information carrying acknowledgement resource indicator (ARI) information to configure the uplink control channel resources for the terminal equipment, to the terminal equipment, wherein the ARI information corresponds to the offset values.

Compared with the related art, the embodiments of the present disclosure have the following advantages:

According to technical solutions provided by embodiments of the present disclosure, the uplink control channel resources are configured for a terminal equipment, by means of a semi-statically configured initial resource as well as dynamically configured ACK/NACK Resource Indication (ARI) information to indicate a selection result or offset information, thereby achieving a resource allocation scheme of uplink control channels in combination with dynamic indication and semi-static indication. The method provided by embodiments of the present disclosure can be achieved in a simple and easy manner, and simultaneously can be used in FDD system and TDD system.

DETAILED DESCRIPTION OF PREFERRED EMBODIMENTS

In the LTE advanced system, a UE provided with multiple transmitting antennae can realize transmit diversity for PUCCH by using SORTD, thereby improving reliability or capacity of uplink control signaling transmission.

However, in order to support transmit diversity, each antenna port is to be allocated with one uplink control channel resource respectively. In the related art, no technical solution has been proposed to solve the corresponding problem. For this purpose, embodiments of the present disclosure propose a method of resource configuration when uplink control channel is transmitted by SORTD.

The embodiments of the present disclosure provide a method of configuring uplink control channel resources under a multi-antenna scene, so as to configure uplink control channel resources for a terminal equipment by combining dynamic indication with semi-static indication.

In the embodiments of the present disclosure, uplink control channel resource is configured through the following two strategies according to differences between the contents of semi-static indication and dynamic indication, as below.

First Strategy. An initial candidate resource set is semi-statically indicated, then a selected result to allocate uplink control channel resources is dynamically indicated.

Second Strategy. An initial resource is semi-statically indicated, then offset information to allocate uplink control channel resources is dynamically indicated.

The approaches to the aforementioned two strategies shall be explained hereinbelow through specific embodiments respectively.

Figure 1:
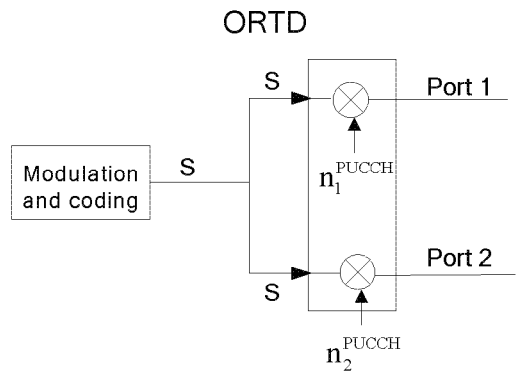
FIG. 1 is a schematic diagram of transmit diversity by SORTD in case of two antenna ports in the related art.
Figure 2:
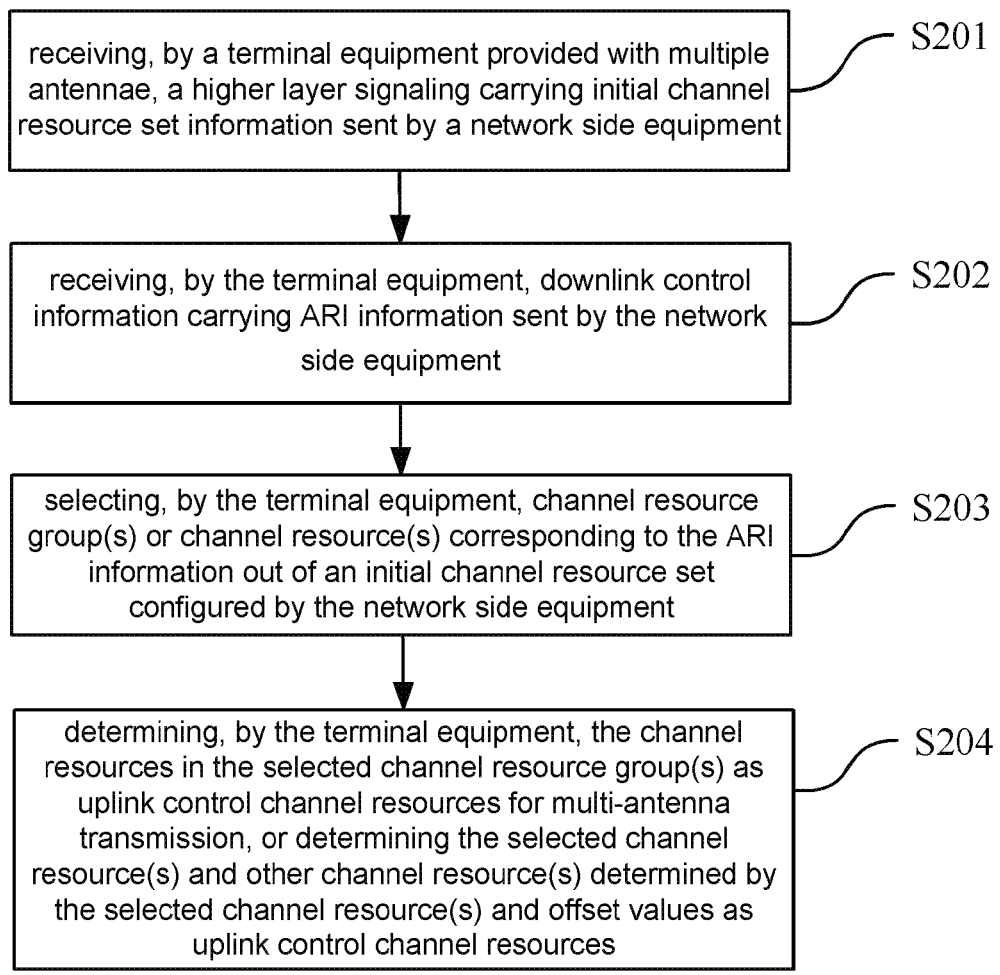
FIG. 2 is a flow chart of a method for configuring uplink control channel resources under a multi-antenna scene according to a first application strategy provided in an embodiment of the present disclosure.

FIG. 2 is a flow chart of a method for configuring uplink control channel resources under a multi-antenna scene according to a first application strategy provided in an embodiment of the present disclosure, which may include the following steps:

Step S201: A terminal equipment provided with multiple antennae receives a higher layer signaling carrying initial channel resource set information, and the higher layer signaling is sent by a network side equipment.

A network side equipment configures the initial channel resource set for the terminal equipment through this step, i.e., the aforesaid initial candidate resource set.

Herein, the initial channel resource set may include at least one channel resource group or at least one channel resource.

It needs to be noted that the aforementioned initial channel resource set may be shared by several terminal equipments. But in a specific application process, in order to avoid resource conflict, a same channel resource group or a same channel resource is only allocated to a unique terminal equipment in a same sub-frame.

Step S202: The terminal equipment receives downlink control information carrying ARI (ACK/NACK Resource Indicator) information, and the downlink control information is sent by the network side equipment.

When implicit resource(s) corresponding to PDCCH CCE is available to the terminal equipment, a specific size of ARI information is $\lceil \log_2 (N+1) \rceil$ bits, while different values of the ARI information correspond to the implicit resource(s) and respective channel resource groups or respective channel resources within the initial channel resource set respectively; on the other hand, when the implicit resource(s) corresponding to PDCCH CCE is unavailable to the terminal equipment, or the terminal equipment transmits feedback information through PUCCH format 3, the specific size of ARI information is $\lceil \log_2 \rceil$ bits, while different values of the ARI information correspond to respective channel resource groups or respective channel resources within the initial channel resource set, where, N is a number of channel resource groups or channel resources within the initial channel resource set configured by the network side equipment.

In a further aspect, in the downlink control information, ARI information can be carried in the following three manners:

(1) The information is carried by newly-added bits in the DCI (Downlink Control Information) sent by a network side equipment; or (2) The information is obtained by joint encoding with other original information in the DCI sent by the network side equipment; or (3) The information is carried by one or more original information bits in the DCI sent by the network side equipment.

Step S203: The terminal equipment selects one or more channel resource groups or one or more channel resources corresponding to the ARI information out of an initial channel resource set configured by the network side equipment.

Step S204: The terminal equipment determines the channel resources in the selected channel resource group(s) as uplink control channel resources for multi-antenna transmission, or determines the selected channel resource(s) and other channel resource(s) determined by the selected channel resource(s) and one or more offset values as uplink control channel resources for multi-antenna transmission.

It needs to be noted that methods for acquiring the aforementioned offset values include:

(1) The terminal equipment acquires the offset values by receiving a higher layer signaling carrying offset value information, and the higher layer signaling is sent by network side equipment; or (2) The offset values are obtained by the terminal equipment from preset offset values corresponding to the network side equipment.

It can be seen from the above explanation that corresponding differences exist in subsequent processing procedures when the contents configured for the terminal equipment in step S201 are different. Specifically:

First Case: The configured initial channel resource set is the set having at least one channel resource group.

Under such a case, the ARI information indicates the selected result directly, and the terminal equipment selects one channel resource group corresponding to the ARI information within the channel resource set based on the selected result, and directly determines the channel resources in the channel resource group as its own uplink control channel resources.

Second Case: The configured initial channel resource set is the set having at least one channel resource.

Under such a case, the selected result indicated by the ARI information is only one channel resource, while for the terminal equipment provided with multiple antennae, channel resource(s) of other antennae needs to be determined. Therefore, one or more offset values are further introduced in the technical solution provided by the embodiments of the present disclosure. Based on the indicated channel resource, an offset processing is performed to obtain the channel resources for other antennae, thereby determining the channel resource indicated by ARI information and other channel resources after the offset processing as the uplink control channel resources corresponding to its own multiple antennae.

To further explain the technical solutions put forward in the embodiments of the present disclosure, the present disclosure is described by the following embodiments corresponding to the above two cases.

Firstly, the first case mentioned above will be explained.

In a system according to the first case, a network side equipment semi-statically allocates one uplink control channel resource set to a terminal equipment through a higher layer signaling. The uplink control channel resource set has $N \geq 1$ groups of elements and each group of elements corresponds to two channel resource indices $(n_{x,1}^{PUCCH}, n_{x,2}^{PUCCH})$ available to ACK/NACK feedback, where, $x=0, 1, \ldots, N-1$ are indices of elements in the set, and respective channel resource elements in the uplink control channel resource set can be shared by multiple terminal equipments.

It needs to be noted that, the aforementioned configuration scheme is for a scene of a terminal equipment provided with two antennae. As for another scene of a terminal equipment provided with more antennae, the elements in each element group may include more elements, i.e., a number of elements included in each element group coindents with the number of antenna.

During downlink data scheduling by a network side equipment, it informs a terminal equipment which resource group in the uplink control channel resource set is to be adopted to transmit corresponding ACK/NACK of downlink data through ARI information in PDCCH.

The network side equipment requires that at most one terminal equipment be allocated with the same group of channel resources in one sub-frame by scheduling, in order to avoid channel resource collision.

Herein, the aforementioned ARI information may be newly added bits in the DCI format used for downlink scheduling, or joint encoding with other signaling in the current DCI format of Rel-8, or even multiplex signalings in the current DCI format. Specifically which form will be used to indicate ARI information may be adjusted according to actual needs, and such changes will not affect the protection scope of the present disclosure.

In such cases, specific values of ARI may follow three situations as below:

(1) When a terminal equipment transmits ACK/NACK through PUCCH format 1/1a/1b, A. If the terminal equipment may use corresponding implicit resource(s) of PDCCH CCE, a size of the ARI will be $\lceil \log_2(N+1) \rceil$ bits, where one state to indicate the implicit resource(s) will be preserved. For example, when N=3 and the size of the ARI is $\lceil \log_2(3+1) \rceil = 2$ bits, resource mapping will be illustrated in the following Table 1 as below.

TABLE 1

| ARI Mapping Diagram | |
|---|---|
| ARI valve | PUCCH resource |
| 00 | Implied resource |
| 01 | $(n_{0,1}^{PUCCH}, n_{0,2}^{PUCCH})$ |
| 10 | $(n_{1,1}^{PUCCH}, n_{1,2}^{PUCCH})$ |
| 11 | $(n_{2,1}^{PUCCH}, n_{2,2}^{PUCCH})$ |

The above mapping relationship is only an optimal example given by the embodiments of the present disclosure. In actual applications, mapping relationship having other forms can also be applied, and such changes will not affect the protection scope of the present disclosure.

The aforementioned explanation is also applicable to subsequent embodiments, i.e., the mapping relationship given in subsequent embodiments may also have the above characteristics, which are only optimal examples and will not be explained hereinafter.

B. If the terminal equipment does not use the implicit resource(s), the size of ARI will be $\lceil \log_2 N \rceil$ bits. For example, when N=4 and the size of ARI is $\lceil \log_2 4 \rceil = 2$ bits, resource mapping will be illustrated in the following Table 2 as below.

TABLE 2

| ARI Mapping Diagram | |
|---|---|
| ARI valve | PUCCH resource |
| 00 | $(n_{0,1}^{PUCCH}, n_{0,2}^{PUCCH})$ |
| 01 | $(n_{1,1}^{PUCCH}, n_{1,2}^{PUCCH})$ |
| 10 | $(n_{2,1}^{PUCCH}, n_{2,2}^{PUCCH})$ |
| 11 | $(n_{3,1}^{PUCCH}, n_{3,2}^{PUCCH})$ |

(2) If a terminal equipment transmits ACK/NACK through PUCCH format 3, then a size of ARI is $\lceil \log_2 N \rceil$ bits. The specific processing procedure is similar to case B above. And corresponding resource mapping can be performed according to Table 2, which will not be explained here.

Figure 3:
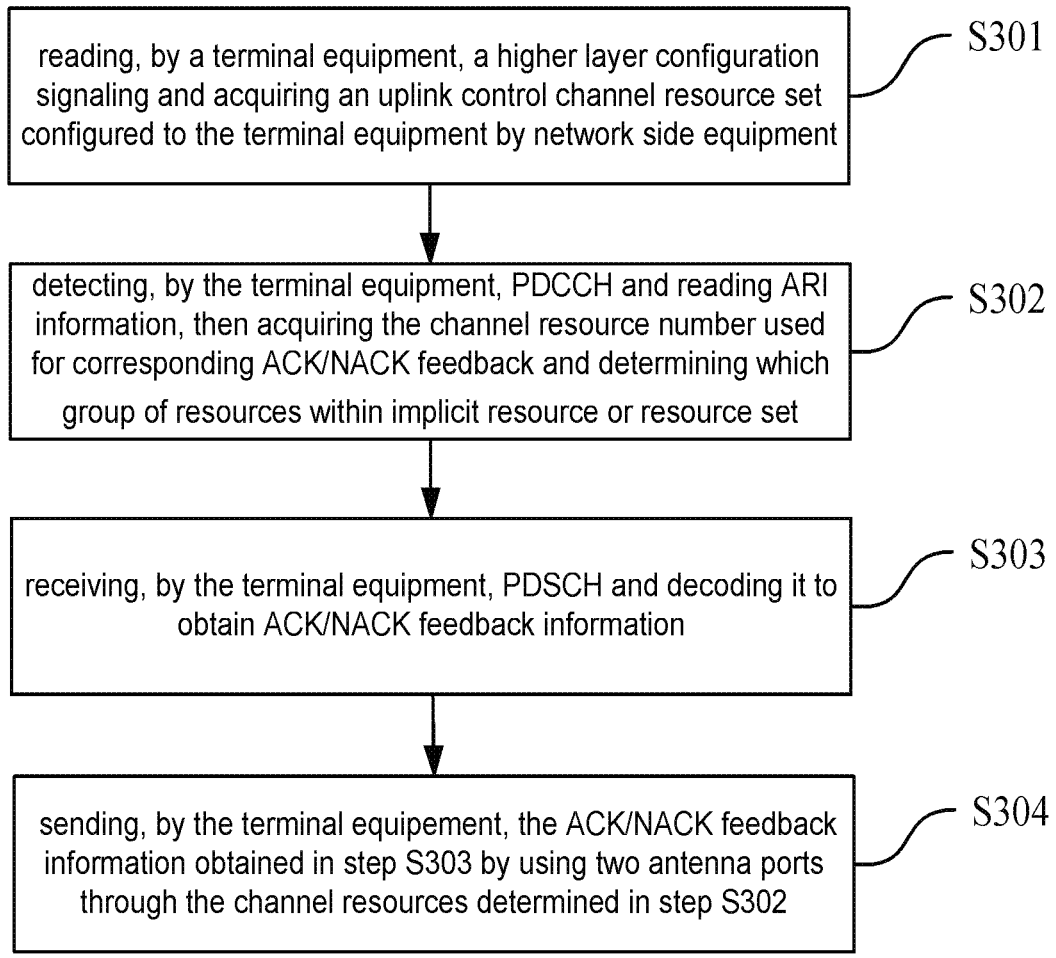
FIG. 3 is a flow chart of a method for configuring uplink control channel resources under a multi-antenna scene according to a specific scene provided in an embodiment of the present disclosure.

Based on the above explanation, under such cases, FIG. 3 is a flow chart of a method for configuring uplink control channel resources under a multi-antenna scene for a specific scene provided by an embodiment of the present disclosure, which may include the following steps.

Step S301: A terminal equipment reads a higher layer configuration signaling and acquires the uplink control channel resource set configured for the terminal equipment by a network side equipment, $\{(n_{0,1}^{PUCCH}, n_{0,2}^{PUCCH}), (n_{1,1}^{PUCCH}, n_{1,2}^{PUCCH}), \ldots, (n_{N-1,1}^{PUCCH}, n_{N-1,2}^{PUCCH})\}$.

Step S302: The terminal equipment detects PDCCH and reads ARI information, then acquires the channel resource index X used for corresponding ACK/NACK feedback and determines which certain resource group in the uplink control channel resource set or the implicit resource(s) to be used.

Step S303: The terminal equipment receives PDSCH (Physical Downlink Shared Channel) and decodes it to obtain ACK/NACK feedback information.

Step S304: The terminal equipment sends the ACK/NACK feedback information obtained in step S303 using two antenna ports with the channel resources determined in step S302.

On the other hand, description of the second case mentioned above is made.

In a system according to the second case, a network side equipment semi-statically allocates one uplink control channel resource set to a terminal equipment through a higher layer signaling. The uplink control channel resource set has N≥1 elements and each element corresponds to one channel resource index $n_{x,1}^{PUCCH}$ available to ACK/NACK feedback, where, x=0, 1, . . . , N−1 are indices of elements in the uplink control channel resource set, and respective channel resource elements in the uplink control channel resource set can be shared by multiple terminal equipments.

During downlink data scheduling by a network side equipment, it informs a terminal equipment which resource in the uplink control channel resource set, such as $n_{x,1}^{PUCCH}$, is to be adopted to transmit corresponding ACK/NACK of downlink data by a certain predetermined antenna port (e.g., antenna port 1), through ARI information in PDCCH.

Thereafter the terminal equipment may obtain the resource for another antenna port according to a fixed offset value ($\Delta_{offset}$), i.e., $n_{x,1}^{PUCCH}+\Delta_{offset}$. Herein, $\Delta_{offset}$ may be configured either by a higher layer semi-statically or preset by the system.

The network side equipment requires that at most one terminal equipment be allocated with the same channel resource in one sub-frame by scheduling, in order to avoid channel resource collision.

Herein, the aforementioned ARI information may be newly added bits in the DCI format used for downlink scheduling, or joint encoding with other signaling in the current DCI format of Rel-8, or even multiplex signalings in the current DCI format. Specifically which form will be used to indicate ARI information may be adjusted according to actual needs, and such changes will not affect the protection scope of the present disclosure.

In such cases, specific values of ARI may follow three situations as below:

(1) When ACK/NACK is transmitted through PUCCH format 1/1a/1b,

A. If the terminal equipment may use corresponding implicit resource(s) of PDCCH CCE, a size of the ARI will be $\lceil \log_2 (N+1) \rceil$ bits, where one state to indicate the implicit resource(s) will be preserved. For example, when N=3 and the size of the ARI is $\lceil \log_2(3+1) \rceil$=2 bits, resource mapping will be illustrated in the following Table 3 as below.

TABLE 3

ARI Mapping Diagram

| ARI valve | PUCCH resource |
| --- | --- |
| 00 | implicit resource(s) |
| 01 | $n_{0,1}^{PUCCH}$ |
| 10 | $n_{1,1}^{PUCCH}$ |
| 11 | $n_{2,1}^{PUCCH}$ |

B. If the terminal equipment does not use the implicit resource(s), the size of ARI will be $\lceil \log_2 N \rceil$ bits. For example, when N=4 and the size of ARI is $\lceil \log_2 4 \rceil$=2 bits, resource mapping will be illustrated in the following Table 4 as below.

TABLE 4

ARI Mapping Diagram

| ARI valve | PUCCH resource |
| --- | --- |
| 00 | $n_{0,1}^{PUCCH}$ |
| 01 | $n_{1,1}^{PUCCH}$ |
| 10 | $n_{2,1}^{PUCCH}$ |
| 11 | $n_{3,1}^{PUCCH}$ |

(2) If a terminal equipment transmits ACK/NACK through PUCCH format 3, then a size of ARI is $\lceil \log_2 N \rceil$ bits. The specific processing procedure is similar to case B above. And corresponding resource mapping can be performed according to Table 4, which will not be explained here.

Figure 4:
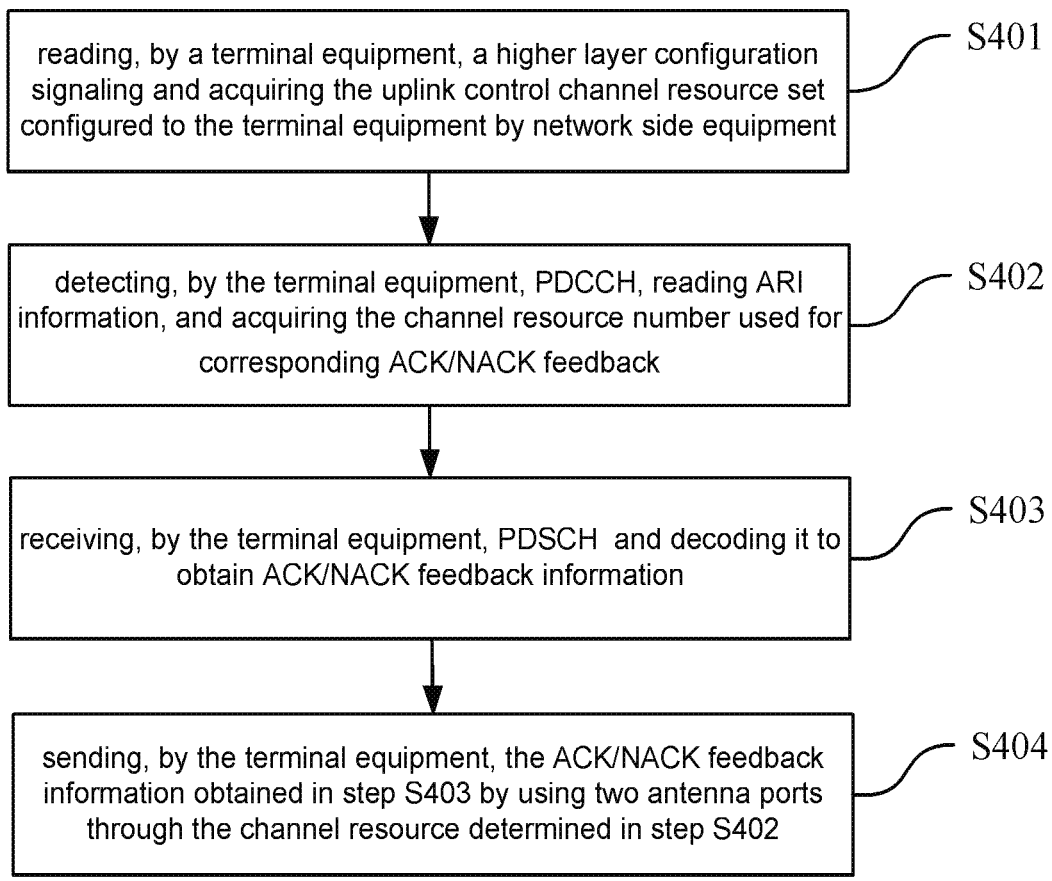
FIG. 4 is a flow chart of a method for configuring uplink control channel resources under a multi-antenna scene according to another specific scene provided in an embodiment of the present disclosure.

Based on the above explanation, under such cases, FIG. 4 is a flow chart of a method for configuring uplink control channel resources under a multi-antenna scene for another specific scene provided by an embodiment of the present disclosure, which may include the following steps.

Step S401: A terminal equipment reads a higher layer configuration signaling and acquires the uplink control channel resource set configured for the terminal equipment by a network side equipment, $\{n_{0,1}^{PUCCH}, n_{1,1}^{PUCCH}, \ldots, n_{N-1,1}^{PUCCH}\}$ and the offset value, $\Delta_{offset}$.

Step S402: The terminal equipment detects PDCCH, reads ARI information, and acquires the channel resource index X used for corresponding ACK/NACK feedback. The terminal equipment determines which certain resource $n_{x,1}^{PUCCH}$ in the uplink control channel resource set or the implicit resource(s) used for a preset antenna port (e.g., antenna port 1).

The terminal equipment calculates the resource index $n_{x,1}^{PUCCH}+\Delta_{offset}$ corresponding to another antenna port based on $n_{x,1}^{PUCCH}$ and $\Delta_{offset}$.

Step S403: The terminal equipment receives PDSCH (Physical Downlink Shared Channel) and decodes it to obtain ACK/NACK feedback information.

Step S404: The terminal equipment sends the ACK/NACK feedback information obtained in step S403 using two antenna ports with the channel resources determined in step S402.

Compared with the related art, the embodiments of the present disclosure have the following advantages: According to technical solutions provided by embodiments of the present disclosure, the uplink control channel resources are configured for a terminal equipment, by means of a semi-statically configured initial resource as well as dynamically configured ACK/NACK Resource Indication (ARI) information to indicate a selection result or offset information, thereby achieving a resource allocation scheme of uplink control channels in combination with dynamic indication and semi-static indication. The method provided by embodiments of the present disclosure can be achieved in a simple and easy manner, and simultaneously can be used in FDD system and TDD system.

Figure 5:
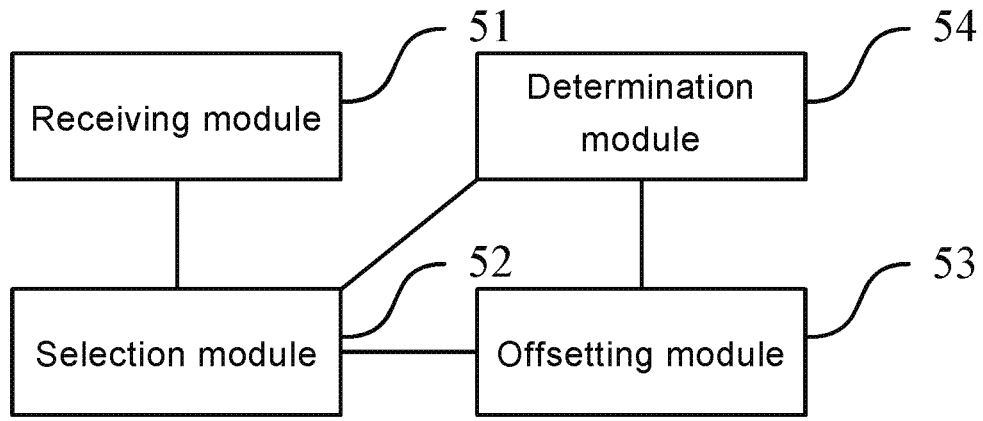
FIG. 5 is a structure diagram of a terminal equipment provided in an embodiment of the present disclosure.

To realize the aforementioned technical solutions of the embodiment of the present disclosure corresponding to the first strategy, the embodiments of the present disclosure also provide a terminal equipment having a structural diagram shown in FIG. 5, which includes:

a receiving module 51 configured for receiving downlink control information carrying ARI information, and the downlink control information is sent by a network side equipment;

a selection module 52 configured for selecting one or more channel resource groups or one or more channel resources corresponding to the ARI information received by receiving module 51 out of an initial channel resource set configured by network side equipment. The initial channel resource set may include multiple channel resource groups or multiple channel resources;

an offsetting module 53 configured for obtaining, when one or more channel resources are selected by selection module 52, other channel resources through the selected channel resources and one or more offset values; and a determination module 54 configured for determining the channel resources in the channel resource group(s) selected by selection module 52 as the uplink control channel resources for multi-antenna transmission, or determining other channel resource(s) according the channel resource selected by selection module 52 and the offset obtained by offsetting module 53 as the uplink control channel resources for multi-antenna transmission.

In a specific application scene, receiving module 51 is also used to receive a higher layer signaling carrying the initial channel resource set information, and the higher layer signaling is sent by the network side equipment.

Herein, one channel resource group or one channel resource within the initial channel resource set is only allocated to a unique terminal equipment in a same sub-frame.

In a further aspect, determination module 54 may be specifically configured as:

Determination module 54 regards the channel resources corresponding to ARI information selected out of the initial channel resource set configured by selection module 52 at the network side equipment as the uplink control channel resources of a certain antenna in the multiple antennae; and Determination module 54 regards the offset channel resources generated by offsetting module 53 through the channel resource and one or more offset values as the uplink control channel resources of other antennae in the multiple antennae.

Figure 6:
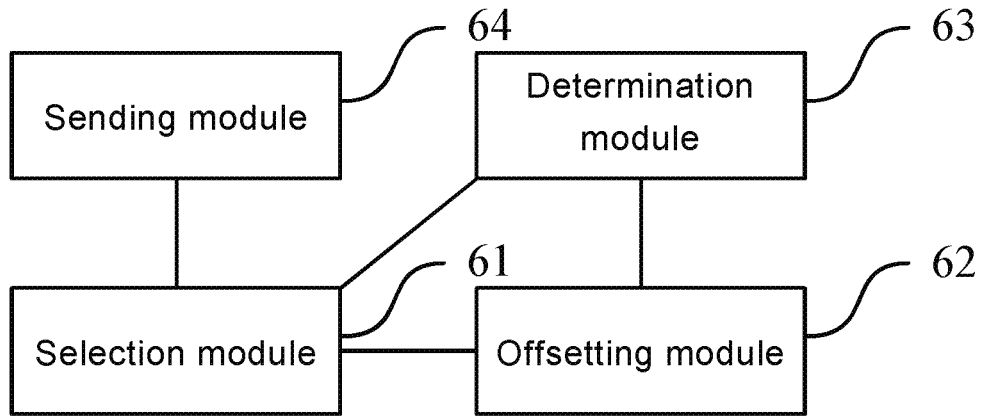
FIG. 6 is a structure diagram of a network side equipment provided in an embodiment of the present disclosure.

Correspondingly, the embodiments of the present disclosure also provide a network side equipment, having a structural diagram shown in FIG. 6, which may include:

a selection module 61 configured for selecting one or more channel resource groups or one or more channel resources configured for a terminal equipment provided with multiple antennae out of an initial channel resource set configured for the terminal equipment. And the initial channel resource set may include multiple channel resource groups or multiple channel resources;

an offsetting module 62 configured for obtaining, when one or more channel resources are selected by selection module 61, the offset channel resource through the selected channel resources and one or more offset values;

a determination module 63 configured for determining the channel resources in the channel resource group(s) selected by selection module 61 as the uplink control channel resources for multi-antenna transmission of the terminal equipment, or determining channel resource selected by selection module 61 and other channel resources determined by offsetting module 62 through the channel resource and one or more offset values as the uplink control channel resources for multi-antenna transmission of the terminal equipment and a sending module 64 configured for sending downlink control information carrying ARI information to the terminal equipment, in order to configure the uplink control channel resources for terminal equipment. And the ARI information corresponds to one or more channel resource groups or one or more channel resources selected by selection module 61.

In a specific application scene, sending module 64 is also used for sending a higher layer signaling carrying initial channel resource set information to the terminal equipment. Herein, sending module 64 ensures one channel resource group or one channel resource included in the initial channel resource set is only allocated to a unique terminal equipment in a same sub-frame by sending scheduling information to the terminal equipment.

Compared with the related art, the embodiments of the present disclosure have the following advantages: According to technical solutions provided by embodiments of the present disclosure, the uplink control channel resources are configured for a terminal equipment, by means of a semi-statically configured initial resource as well as dynamically configured ACK/NACK Resource Indication (ARI) information to indicate a selection result or offset information, thereby achieving a resource allocation scheme of uplink control channels in combination with dynamic indication and semi-static indication. The method provided by embodiments of the present disclosure can be achieved in a simple and easy manner, and simultaneously can be used in FDD system and TDD system.

The aforementioned second strategy is further explained below.

Figure 7:
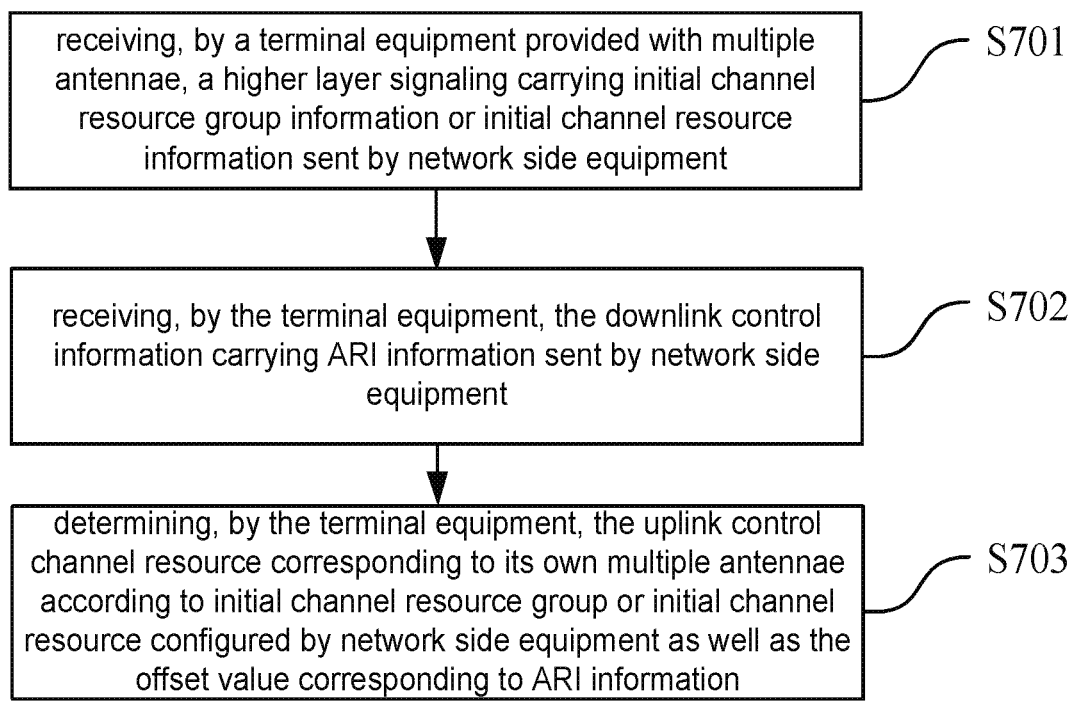
FIG. 7 is a flow chart of a method for configuring uplink control channel resources under a multi-antenna scene according to a second application strategy provided in an embodiment of the present disclosure.

FIG. 7 is a flow chart of a method for configuring uplink control channel resources under a multi-antenna scene according to a second application strategy provided in an embodiment of the present disclosure, which may include the following steps:

Step S701: A terminal equipment provided with multiple antennae receives a higher layer signaling carrying initial channel resource set information or the initial channel resource information, and the higher layer signaling is sent by a network side equipment.

Through this step, the network side equipment configures the initial channel resource for the terminal equipment, i.e., the initial resource mentioned before.

Herein, the initial channel resource may include one channel resource group or one channel resource.

It needs to be noted that the aforementioned initial channel resource may be shared by several terminal equipments. However in a specific application process, in order to avoid resource conflict, one channel resource group or one channel resource is only be allocated to a unique terminal equipment in a same sub-frame.

Step S702: The terminal equipment receives downlink control information carrying ARI information, and the downlink control information is sent by network side equipment.

In the downlink control information, ARI information can be carried in the following three manners:

(1) The information is carried by newly-added bits in the DCI (Downlink Control Information) sent by a network side equipment; or (2) The information is obtained by joint encoding with other original information in the DCI sent by the network side equipment; or (3) The information is carried by one or more original information bits in the DCI sent by the network side equipment.

Step S703: The terminal equipment determines the uplink control channel resources corresponding to its own multiple antennae according to the initial channel resource group or the initial channel resource configured by the network side equipment as well as one or more offset values corresponding to the ARI information.

It can be seen from the above explanation that corresponding difference also exists in subsequent processing procedures when the contents configured for the terminal equipment in step S701 are different. Specifically:

First Case: The configured initial channel resource is one channel resource group.

The terminal equipment determines the uplink control channel resources corresponding to its own multiple antennae according to respective initial channel resources within the initial channel resource group and one or more offset values corresponding to the ARI information respectively.

Under such a case, the offset values corresponding to the ARI information may be one or more offset values specifically.

Based on the above, the processing procedure of step S703 may be:

The terminal equipment determines the uplink control channel resources corresponding to its own multiple antennae according to respective initial channel resources within the initial channel resource group and a same offset value respectively; or, The terminal equipment determines the uplink control channel resource corresponding to its own multiple antennae according to respective initial channel resources within the initial channel resource group and different offset values respectively.

Second Case: The configured initial channel resource is one channel resource.

The terminal equipment determines a first offset channel resource according to the initial channel resource and one or more offset values corresponding to the ARI information, while other offset channel resources based on the first offset channel resource and one or more fixed offset values, and then determines the first offset channel resource and the other offset channel resources as corresponding uplink control channel resources of its own multiple antennae.

Under such a case, the offset values corresponding to the ARI information is one offset value specifically.

It needs to be noted that one or more fixed offset values mentioned above are configured through the following methods:

(1) The terminal equipment obtains one or more fixed offset values from received higher layer signaling carrying offset value information sent by a network side equipment; or (2) The fixed offset values are both preset in the terminal equipment and the network side equipment.

To further explain the technical solutions put forward in the embodiments of the present disclosure, the embodiments below will be described corresponding to the above two cases.

Firstly, the first case mentioned above will be explained.

In a system according to the first case, a network side equipment semi-statically allocates two-element group $(n_1^{PUCCH}, n_2^{PUCCH})$ composed by two uplink control channel resources to the terminal equipment through a higher layer signaling. The channel resource elements may be shared by many terminal equipments.

It needs to be noted that the aforementioned configuration scheme is for a scene of a terminal equipment provided with two antennae. As for another scene of a terminal equipment provided with more antennae, the aforesaid element group may include more elements, i.e., a number of elements included in each element group coindents with the number of antennae.

During downlink data scheduling by a network side equipment, it informs a terminal equipment of one or more offset values between actually used resource and $(n_{x,1}^{PUCCH}, n_2^{PUCCH})$ through ARI information in PDCCH.

The network side equipment requires that at most one terminal equipment be allocated with the same group of channel resources in one sub-frame by scheduling, in order to avoid channel resource collision.

Herein, the aforementioned ARI information may be the newly added bits in the DCI format used for downlink scheduling, or joint encoding with other signaling in the current DCI format of Rel-8, or even multiplex signalings in the current DCI format. Specifically which form will be used to indicate ARI information may be adjusted according to actual needs, and such changes will not affect the protection scope of the present disclosure.

In such cases, specific values of ARI may follow two situations as below:

(1) Two antenna ports may adopt a same offset $\Delta_{offset}$ and uplink control channel resources actually used are $(n_1^{PUCCH}+\Delta_{offset}, n_2^{PUCCH}+\Delta_{offset})$; Supposed that $\Delta_{offset}$ has M values, then a size of ARI is $\lceil \log_2 M \rceil$ bits. For example, when M=4, the size of ARI is $\lceil \log_2 4 \rceil = 2$ bits and resource mapping will be illustrated in the following Table 5 as below.

TABLE 5

| ARI Mapping Diagram | |
| --- | --- |
| ARI valve | $\Delta_{offset}$ Value |
| 00 | −1 |
| 01 | 0 |
| 10 | 1 |
| 11 | 2 |

(2) The two antenna ports may also use different offset values, i.e., $\Delta_{offset1}$ and $\Delta_{offset2}$, then the uplink control channel resources actually used are $(n_1^{PUCCH}+\Delta_{offset1}, n_2^{PUCCH}+\Delta_{offset2})$; Supposed that $\Delta_{offset}$ has M values, then ARI is composed of two parts: ARI1 and ARI2, and each part includes $\lceil \log_2 M \rceil$ bits. For example, when M=2, a size of ARIx is 1 bit and resource mapping will be illustrated in the following Table 6 as below. And for the different ARIx, the values of $\Delta_{offsetx}$ may be different.

TABLE 6

| ARI Mapping Diagram | |
| --- | --- |
| ARIx Value | $\Delta_{offset}$ Value |
| 0 | 0 |
| 1 | 1 |

Figure 8:
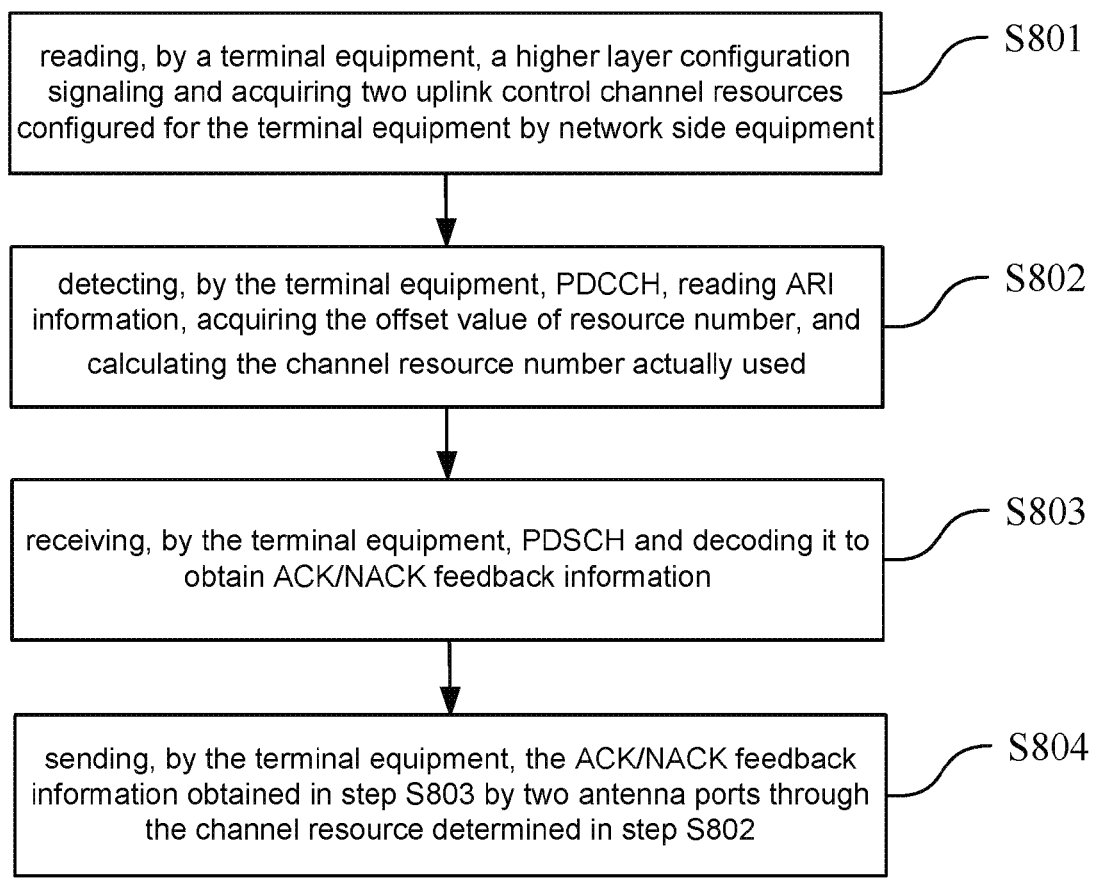
FIG. 8 is a flow chart of a method for configuring uplink control channel resources under a multi-antenna scene according to another specific scene provided in an embodiment of the present disclosure.

Based on the above description, under such cases, FIG. 8 is a flow chart of a method for configuring uplink control channel resources under a multi-antenna scene for another specific scene provided by an embodiment of the present disclosure, which may include the following steps.

Step S801: A terminal equipment reads a higher layer configuration signaling and acquires two uplink control channel resources $(n_{x,1}^{PUCCH}, n_{x,2}^{PUCCH})$ configured for the terminal equipment by a network side equipment.

Step S802: The terminal equipment detects PDCCH, reads ARI information, then acquires the offset value of resource index and calculates the channel resource indices actually used, with detailed description as follows:

(1) When two antenna ports adopt a same offset $\Delta_{offset}$, the channel resources actually used by a terminal equipment are $(n_1^{PUCCH}+\Delta_{offset}, n_2^{PUCCH}+\Delta_{offset})$.

(2) When two antenna ports adopt different offset $\Delta_{offset1}$ and $\Delta_{offset2}$ the channel resources actually used are $(n_1^{PUCCH}+\Delta_{offset1}, n_2^{PUCCH}+\Delta_{offset2})$ Step S803: The terminal equipment receives PDSCH and decodes it to obtain ACK/NACK feedback information.

Step S804: The terminal equipment sends the ACK/NACK feedback information obtained in step S803 using two antenna ports with the channel resources determined in step S802.

In a further aspect, description of the second case above is made.

In a system according to the second case, a network side equipment semi-statically allocates one uplink control channel resource $n_1^{PUCCH}$ to the terminal equipment through a higher layer signaling. The channel resource elements may be shared by many terminal equipments.

During downlink data scheduling by a network side equipment, it informs a terminal equipment of an $\Delta_{offset1}$ value between the actually used resource for a certain preset antenna port (e.g., antenna port 1) and $n_1^{PUCCH}$, i.e., the actually used resource is $n_1^{PUCCH}+\Delta_{offset1}$, and the terminal equipment obtains the resource used by another antenna port, $n_1^{PUCCH}+\Delta_{offset1}+\Delta_{offset2}$ based on a fixed offset value ($\Delta_{offset2}$). Herein, the fixed offset value $\Delta_{offset2}$ may be either configured semi-statically by a higher layer signaling or preset by the system. Supposed that $\Delta_{offset1}$ has M values, a size of ARI is $\lceil \log_2 M \rceil$ bits. Its specific processing is similar to the situation corresponding to Table 5 mentioned above and corresponding resource mapping may be illustrated according to Table 5, which will not be repeated here.

The network side equipment requires that at most one terminal equipment be allocated with the same group of channel resources in one sub-frame by scheduling, in order to avoid channel resource collision.

Herein, the aforementioned ARI information may be the newly added bits in the DCI format used for downlink scheduling, or joint encoding with other signaling in the current DCI format of Rel-8, or even multiplex signalings in the current DCI format. Specifically which form will be used to indicate ARI information may be adjusted according to actual needs, and such changes will not affect the protection scope of the present disclosure.

Figure 9:
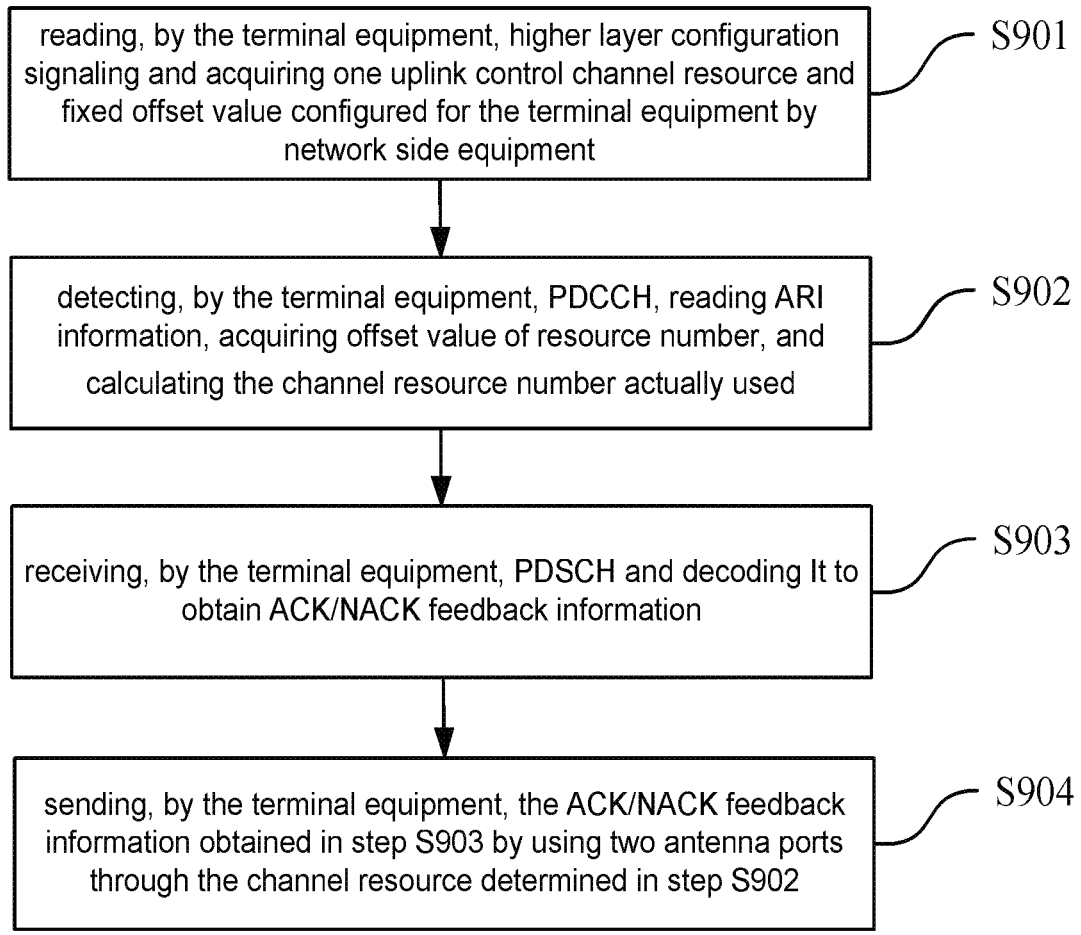
FIG. 9 is a flow chart of a method for configuring uplink control channel resources under a multi-antenna scene according to another specific scene provided in an embodiment of the present disclosure.

Based on the above description, under such cases, FIG. 9 is a flow chart of a method for configuring uplink control channel resources under a multi-antenna scene for another specific scene provided by an embodiment of the present disclosure, which may include the following steps.

Step S901: A terminal equipment reads a higher layer configuration signaling and acquires one uplink control channel resource $n_1^{PUCCH}$ and a fixed offset value $\Delta_{offset2}$ configured to the terminal equipment by a network side equipment.

Step S902: The terminal equipment detects PDCCH, reads ARI information, then acquires the offset value $\Delta_{offset1}$ of resource index and calculates the channel resource indices actually used.

The resource corresponding to antenna port 1 is $n_1^{PUCCH} \times \Delta_{offset1}$; and The resource corresponding to antenna port 2 is $n_1^{PUCCH}+\Delta_{offset1}+\Delta_{offset2}$.

Step S903: The terminal equipment receives PDSCH and decodes it to obtain ACK/NACK feedback information.

Step S904: The terminal equipment sends the ACK/NACK feedback information obtained in step S903 using two antenna ports with the channel resources determined in step S902.

Compared with the related art, the embodiments of the present disclosure have the following advantages:

According to technical solutions provided by embodiments of the present disclosure, the uplink control channel resources are configured for a terminal equipment, by means of a semi-statically configured initial resource as well as dynamically configured ACK/NACK Resource Indication (ARI) information to indicate a selection result or offset information, thereby achieving a resource allocation scheme of uplink control channels in combination with dynamic indication and semi-static indication. The method provided by embodiments of the present disclosure can be achieved in a simple and easy manner, and simultaneously can be used in FDD system and TDD system.

Figure 10:
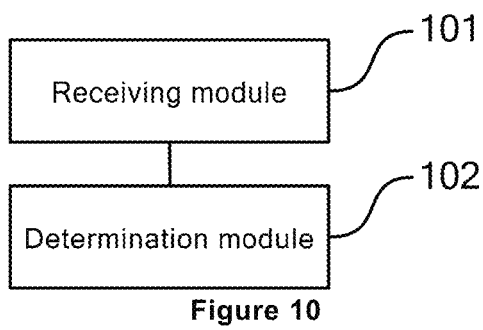
FIG. 10 is a structure diagram of a terminal equipment provided in an embodiment of the present disclosure.

To realize the technical solutions of the embodiments of the present disclosure corresponding to the first strategy mentioned above, the embodiments of the present disclosure also provide a terminal equipment having a structural diagram shown in FIG. 10, which includes:

a receiving module 101 configured for receiving downlink control information carrying ARI information, and the downlink control information is sent by a network side equipment;

a determination module 102 configured for determining uplink control channel resources for multi-antenna transmission according to an initial channel resource group or an initial channel resource configured by the network side equipment, and one or more offset values corresponding to ARI information received by receiving module 101.

In a specific application scene, receiving module 101 is also used for receiving a higher layer signaling carrying the initial channel resource set information or the initial channel resource information, and the higher layer signaling is sent by the network side equipment.

In a further aspect, determination module 102 may be specifically configured as:

When receiving module 101 receives the initial channel resource group configured by the network side equipment, determination module 102 determines the uplink control channel resources for multi-antenna transmission according to respective initial channel resources in the initial channel resource group and one or more offset values corresponding to ARI information received by receiving module 101 respectively.

When receiving module 101 receives the initial channel resource configured by the network side equipment, determination module 102 determines the first offset channel resource according to the initial channel resource and one or more offset values corresponding to ARI information received by receiving module 101, while determines other offset channel resources according to the first offset channel resource and a fixed offset value; and then determines both of the above resources as the uplink control channel resources for multi-antenna transmission.

It needs to be noted that when receiving module 101 receives the initial channel resource group configured by the network side equipment, the offset values corresponding to ARI information is one or more offset values; when it receives the initial channel resource configured by the network side equipment, the offset value corresponding to ARI information is one offset value.

Herein, when receiving module 101 receives the initial channel resource group configured by the network side equipment, determination module 102 may be specifically configured as:

Determining offset channel resources according to respective initial channel resources in the initial channel resource group and a same offset value respectively, and determining respective offset channel resources as offset channel resource group; or, Determining offset channel resources according to respective initial channel resources in the initial channel resource group and different offset values respectively, and determining respective offset channel resources as offset channel resource group.

It needs to be noted that the fixed offset value is acquired by the following methods:

Receiving module 101 acquires the fixed offset value by receiving a higher layer signaling carrying the offset value information, and the higher layer signaling is sent by the network side equipment; or, The terminal equipment acquires the fixed offset value from the preset offset values corresponding to the network side equipment.

Figure 11:
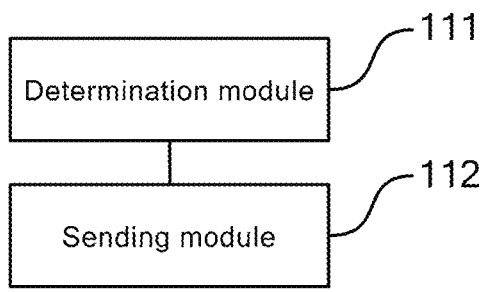
FIG. 11 is a structure diagram of a network side equipment provided in an embodiment of the present disclosure.

Correspondingly, the embodiments of the present disclosure also provides a network side equipment, having a structural diagram shown in FIG. 11, which may include:

a determination module 111 configured for determining uplink control channel resources for multi-antenna transmission according to an initial channel resource group or an initial channel resource configured for a terminal equipment provided with multiple antennae as well as one or more offset values; and a sending module 112 configured for sending the downlink control information carrying ARI information to the terminal equipment to configure the uplink control channel resources for the terminal equipment, and the ARI information corresponds the one or more offset values.

Herein, sending module 112 may also be used for sending a higher layer signaling carrying the initial channel resource group information or the initial channel resource information to the terminal equipment.

In a specific application scene, determination module 111 may be configured as:

When the initial channel resource group is configured for the terminal equipment, determination module 111 determines the uplink control channel resources for multi-antenna transmission according to respective initial channel resources in the initial channel resource group and one or more offset values respectively;

When the initial channel resource is configured for the terminal equipment, determination module 111 determines the first offset channel resource according to the initial channel resource and one or more offset values, while determines other offset channel resources according to the first offset channel resource and the fixed offset values, and determines the above resources as the uplink control channel resources for multi-antenna transmission.

It needs to be noted that when the initial channel resource group is configured for the terminal equipment, specific offset values are one or more offset values; and when the initial channel resource is configured for the terminal equipment, specific offset value is one offset value.

Herein, when the initial channel resource group is configured for the terminal equipment, determination module 111 is used for determining the uplink control channel resources for multi-antenna transmission according to respective initial channel resources in the initial channel resource group and same offset values respectively, or according to respective initial channel resources in the initial channel resource group and different offset values respectively.

Furthermore, when the initial channel resource is configured for the terminal equipment, the specific configuration method of the fixed offset value is that sending module 112 sends a higher layer signaling carrying the fixed offset value information to the terminal equipment, or presets the fixed offset value both in the network side equipment and the terminal equipment.

Compared with the related art, the embodiments of the present disclosure have the following advantages: According to technical solutions provided by embodiments of the present disclosure, the uplink control channel resources are configured for a terminal equipment, by means of a semi-statically configured initial resource as well as dynamically configured ACK/NACK Resource Indication (ARI) information to indicate a selection result or offset information, thereby achieving a resource allocation scheme of uplink control channels in combination with dynamic indication and semi-static indication. The method provided by embodiments of the present disclosure can be achieved in a simple and easy manner, and simultaneously can be used in FDD system and TDD system.

With the description of the preferred embodiments hereinabove, those skilled in the art can clearly understand that the present disclosure can be realized with the aid of software and necessary commonly used hardware platforms, or the aid of hardware of course, but the former is a preferred embodiment in most cases. Based on this understanding, the technical solution of the present disclosure or the part contributing to the related art can be reflected in the form of a software product, which is stored in a memory medium comprising indications to enable a computer equipment, which could be a personal computer, a server or a network device, etc., to carry out the methods according to respective embodiments of the present disclosure.

A skilled person in the art can understand that the attached drawings only refer to the diagram of a preferred embodiment, and the modules or procedures are not necessary for the implementation of the embodiments of the present disclosure.

A skilled person in the art can understand that the module in the unit of an embodiment can be distributed in such unit based on embodiment description, or located in one or more units of another embodiment through corresponding changes. Modules of the embodiments mentioned above can be merged into one module, or further divided into multiple sub-modules.

Any numbers of the aforementioned embodiments of the present disclosure are only used for description rather than for representing advantages or disadvantages.

Only several specific embodiments of the present disclosure are described above. However, the present disclosure is not only comprised of those. Any changes that a skilled person can contemplate are still within the scope of the present disclosure.

The invention claimed is:

1. A method for configuring uplink control channel resources under a multi-antenna scene, comprising:

receiving, by a terminal equipment provided with multiple antennae, downlink control information carrying acknowledgement resource indicator (ARI) information, wherein the downlink control information is sent by a network side equipment;

selecting, by the terminal equipment, one or more channel resource groups or one or more channel resources corresponding to the ARI information out of an initial channel resource set configured by the network side equipment, wherein the initial channel resource set includes multiple channel resource groups or multiple channel resources; and determining, by the terminal equipment, the channel resources in the selected channel resource group(s) as uplink control channel resources for multi-antenna transmission, or determining the selected channel resource(s) and other channel resource(s) determined by the selected channel resource(s) and one or more offset values as uplink control channel resources for multi-antenna transmission, when the terminal equipment cannot use the implicit resource(s) corresponding to the PDCCH CCE or a physical uplink control channel (PUCCH) format 3 is used to transmit feedback information, the specific size of ARI information is $\lceil \log_2 N \rceil$ bits, and different values of the ARI information correspond to respective channel resource groups or respective channel resources within the initial channel resource set, wherein N is a number of channel resource groups or channel resources within the initial channel resource set configured b the network side equipment.

2. The method as claimed in claim 1, wherein the initial channel resource set is configured to the terminal equipment by a higher layer signaling carrying the initial channel resource set information, wherein the higher layer signaling is sent by the network side equipment; and wherein one channel resource group or one channel resource within the initial channel resource set is only allocated to a unique terminal equipment in a same sub-frame.

3. The method as claimed in claim 1, wherein the ARI information is:

information carried by newly-added bits in the downlink control information (DCI) sent by the network side equipment; or, information obtained by joint encoding with other original information in the DCI sent by the network side equipment; or, information carried by original information bits in the DCI sent by the network side equipment.

4. The method as claimed in claim 1, wherein the offset values are obtained by the terminal equipment from received higher layer signaling carrying the offset values sent by the network side equipment; or, the offset values are obtained by the terminal equipment from preset offset values corresponding to the network side equipment.

5. A terminal equipment provided with multiple antennae comprising:

a processor;

a memory, which is connected with the processor and stores program and data used when the processor executes; and a transceiver, which communicates with other communication devices over a transmission medium, wherein the terminal equipment realizes the following processing, when the program and data stored in the memory are called and executed by the processor:

receiving downlink control information carrying acknowledge resource indicator (ARI) information, wherein the downlink control information is sent by a network side equipment;

selectin one or more channel resource groups or one or more channel resources corresponding to the ARI information out of an initial channel resource set configured by the network side equipment, wherein the initial channel resource set includes multiple channel resource groups or multiple channel resources; and determining the channel resources in the selected channel resource group(s) as uplink control channel resources for multi-antenna transmission, or determining the selected channel resource(s) and other channel resource(s) determined by the selected channel resource(s) and one or more offset values as uplink control channel resources for multi-antenna transmission, when the terminal equipment cannot use the implicit resource(s) corresponding to the PDCCH CCE or a physical uplink control channel (PUCCH) format 3 is used to transmit feedback information, the specific size of ARI information is $\lceil \log_2 N \rceil$ bits, and different values of the ARI information correspond to respective channel resource groups or respective channel resources within the initial channel resource set, where N is a number of channel resource groups or channel resources within the initial channel resource set configured by the network side equipment.

6. The terminal equipment as claimed in claim 5, wherein the terminal equipment is configured for:

receiving a higher layer signaling carrying the initial channel resource set information, wherein the higher layer signaling is sent by the network side equipment; and wherein one channel resource group or one channel resource within the initial channel resource set is only allocated to a unique terminal equipment in a same sub-frame.

7. The terminal equipment as claimed in claim 5, wherein the ARI information is:

information carried by newly-added bits in the downlink control information (DCI) sent by the network side equipment and received by the receiving module; or, information obtained by joint encoding with other original information in the DCI sent by the network side equipment and received by the receiving module; or, information carried by original information bits in the DCI sent by the network side equipment and received by the receiving module.

8. A method for configuring uplink control channel resources under a multi-antenna scene, comprising:

selecting, by a network side equipment, one or more channel resource groups or one or more channel resources configured for a terminal equipment provided with multiple antennae out of an initial channel resource set configured for the terminal equipment, wherein the initial channel resource set includes multiple channel resource groups or multiple channel resources;

determining, by the network side equipment, the channel resources in the selected channel resource group(s) as uplink control channel resources for multi-antenna transmission of the terminal equipment, or determining the selected channel resources and other channel resources determined by the selected channel resource(s) and one or more offset values as uplink control channel resources for multi-antenna transmission of the terminal equipment; and sending, by the network side equipment, downlink control information carrying acknowledgement resource indicator (ARI) information to the terminal equipment, in order to configure the uplink control channel resources for the terminal equipment, wherein the ARI information corresponds to one or more channel resource groups or one or more channel resources, when the network side equipment determines that the terminal equipment cannot use the implicit resource(s) corresponding to the PDCCH CCE or a physical uplink control channel (PUCCH) format 3 is used to transmit feedback information, the specific size of ARI information is $\lceil \log_2 N \rceil$ bits, and different values of the ARI information correspond to respective channel resource groups or respective channel resources within the initial channel resource set, wherein N is a number of channel resource groups or channel resources within the initial channel resource set configured by the network side equipment.

9. The method as claimed in claim 8, wherein the initial channel resource set is configured to the terminal equipment by a higher layer signaling carrying the initial channel resource set information, wherein the higher layer signaling is sent by the network side equipment to the terminal equipment; and wherein the network side equipment ensures that one channel resource group or one channel resource within the initial channel resource set is only allocated to a unique terminal equipment in a same sub-frame by scheduling signaling.

10. The method as claimed in claim 9, wherein the ARI information is:

information carried by newly-added bits in the downlink control information (DCI) sent by the network side equipment to the terminal equipment; or, information obtained by joint encoding with the other original information in the DCI sent by the network side equipment to the terminal equipment; or, information carried by original information bits in the DCI sent by the network side equipment to the terminal equipment.

11. The method as claimed in claim 8, wherein the offset values are sent by the network side equipment through a higher layer signaling carrying offset value information to the terminal equipment; or, the offset values are obtained by presetting offset values both in the network side equipment and the terminal equipment.

12. A network side equipment, comprising a processor;

a memory, which is connected with the processor and stores program and data used when the processor executes; and a transceiver, which communicates with other communication devices over a transmission medium, wherein the network side equipment realizes the following processing, when the program and data stored in the memory are called and executed by the processor:

selecting one or more channel resource groups or one or more channel resources configured for a terminal equipment provided with multiple antennae out of an initial channel resource set configured for the terminal equipment, wherein the initial channel resource set includes multiple channel resource groups or multiple channel resources;

determining the channel resources in the selected channel resource group(s) as uplink control channel resources for multi-antenna transmission of the terminal equipment, or determining the selected channel resource(s) and other channel resource(s) determined by the selected channel resource(s) and one or more offset values as uplink control channel resources for multi-antenna transmission of the terminal equipment; and sending downlink control information carrying acknowledgement resource indicator (ARI) information to the terminal equipment, in order to configure the uplink control channel resources for the terminal equipment, wherein the ARI information corresponds to one or more channel resource groups or one or more channel resources, when the network side equipment determines that the terminal equipment cannot use the implicit resource(s) corresponding to the PDCCH CCE or a physical uplink control channel (PUCCH) format 3 is used to transmit feedback information, the specific size of ARI information is $\lceil \log_2 N \rceil$ bits, and different values of the ARI information correspond to respective channel resource groups or respective channel resources within the initial channel resource set, where N is a number of channel resource groups or channel resources within the initial channel resource set configured b the network side equipment.

13. The network side equipment as claimed in claim 12, wherein the network side equipment is configured for:

sending a higher layer signaling carrying the initial channel resource set information to the terminal equipment; and wherein it is ensured that one channel resource group or one channel resource within the initial channel resource set is only allocated to a unique terminal equipment in a same sub-frame by scheduling signaling sent by the sending module to the terminal equipment.

* * * * *